(12) United States Patent
Langhorst et al.

(10) Patent No.: US 8,573,571 B2
(45) Date of Patent: Nov. 5, 2013

(54) DISSIPATIVE STRUCTURES AND RELATED METHODS

(75) Inventors: Benjamin R. Langhorst, Idaho Falls, ID (US); Henry S. Chu, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 654 days.

(21) Appl. No.: 12/792,966

(22) Filed: Jun. 3, 2010

(65) Prior Publication Data
US 2012/0125726 A1 May 24, 2012

(51) Int. Cl.
*F16F 3/02* (2006.01)
(52) U.S. Cl.
USPC .............................. 267/151; 267/136; 89/36.02
(58) Field of Classification Search
USPC .................. 188/266, 378–380; 267/142, 145, 267/146–149, 136, 151; 89/36.02; 36/28; 442/121
See application file for complete search history.

(56) References Cited

U.S. PATENT DOCUMENTS

| | | |
|---|---|---|
| 3,604,374 A | 9/1971 | Matson et al. |
| 3,674,115 A | 7/1972 | Young et al. |
| 4,111,097 A | 9/1978 | Lasker |
| 4,321,777 A | 3/1982 | Sauret et al. |
| 4,404,889 A | 9/1983 | Miguel |
| 4,547,122 A | 10/1985 | Leech |
| 4,566,237 A | 1/1986 | Turner |
| 4,646,730 A | 3/1987 | Schonfeld et al. |
| 4,836,079 A | 6/1989 | Barrett |
| 5,022,307 A | 6/1991 | Gibbons et al. |
| 5,090,053 A | 2/1992 | Hayes |
| 5,131,174 A | 7/1992 | Drew et al. |
| 5,225,622 A | 7/1993 | Gettle et al. |
| 5,360,129 A | 11/1994 | Lee |
| 5,394,786 A | 3/1995 | Gettle et al. |
| 5,532,039 A | 7/1996 | Payne et al. |
| 5,654,518 A | 8/1997 | Dobbs |
| 5,918,309 A * | 7/1999 | Bachner, Jr. ..................... 2/2.5 |
| 6,200,664 B1 | 3/2001 | Figge et al. |
| 6,289,816 B1 | 9/2001 | Keenan et al. |
| 6,627,296 B1 | 9/2003 | Tudela et al. |
| 6,861,123 B2 | 3/2005 | Turner et al. |
| 6,901,617 B2 * | 6/2005 | Sprouse et al. .................. 5/654 |
| 7,009,835 B2 | 3/2006 | Desai et al. |
| 7,178,445 B2 | 2/2007 | Wulvik et al. |
| 7,213,494 B2 | 5/2007 | James |
| 7,288,326 B2 | 10/2007 | Elzey et al. |
| 7,575,797 B2 | 8/2009 | Karr et al. |
| 2001/0008053 A1* | 7/2001 | Belli ................................ 36/28 |
| 2004/0118271 A1 | 6/2004 | Puckett et al. |
| 2004/0259447 A1* | 12/2004 | Elkouh et al. ................. 442/121 |
| 2005/0085146 A1 | 4/2005 | Farkas et al. |

(Continued)

*Primary Examiner* — Christopher Schwartz
(74) *Attorney, Agent, or Firm* — TraskBritt (57) ABSTRACT

Dissipative structures include at least one panel and a cell structure disposed adjacent to the at least one panel having interconnected cells. A deformable material, which may comprise at least one hydrogel, is disposed within at least one interconnected cell proximate to the at least one panel. Dissipative structures may also include a cell structure having interconnected cells formed by wall elements. The wall elements may include a mesh formed by overlapping fibers having apertures formed therebetween. The apertures may form passageways between the interconnected cells. Methods of dissipating a force include disposing at least one hydrogel in a cell structure proximate to at least one panel, applying a force to the at least one panel, and forcing at least a portion of the at least one hydrogel through apertures formed in the cell structure.

20 Claims, 5 Drawing Sheets

(56) References Cited

U.S. PATENT DOCUMENTS

| | | |
|---|---|---|
| 2005/0194210 A1* | 9/2005 | Panossian .................... 181/293 |
| 2007/0077835 A1 | 4/2007 | Leivesley |
| 2008/0257137 A1 | 10/2008 | James |
| 2008/0282874 A1 | 11/2008 | Ogden et al. |
| 2008/0282876 A1 | 11/2008 | Leivesley et al. |
| 2009/0104422 A1 | 4/2009 | Sampson |
| 2011/0101714 A1* | 5/2011 | Bator ............................ 293/132 |
| 2011/0174144 A1* | 7/2011 | Kuchinsky et al. .......... 89/36.02 |
| 2011/0283873 A1* | 11/2011 | Wadley et al. ............... 89/36.02 |

* cited by examiner

DISSIPATIVE STRUCTURES AND RELATED METHODS

STATEMENT REGARDING FEDERALLY SPONSORED RESEARCH OR DEVELOPMENT

This invention was made with government support under Contract No. DE-AC07-051D14517 awarded by the United States Department of Energy. The government has certain rights in the invention.

TECHNICAL FIELD

Embodiments of the present invention are directed to dissipative structures for shielding against an applied force. More particularly, embodiments of the present invention are directed to dissipative structures having deformable material disposed within a cell structure in the dissipative structure.

BACKGROUND

Explosive forces and high pressure shock pulses caused by an explosive device or system such as ordnance (e.g., projectiles, bombs, missiles, etc.) or another type of gas or chemical explosion, whether intentional or accidental, may cause substantial damage, injuries, and death. Blast dissipative structures are becoming increasingly desired for use in protecting items of value from the effects of such high pressure impulses.

In order to be effective, blast dissipative structures must absorb and dissipate significant amounts of energy to prevent damage from the pressure impulse generated by an explosion. Concrete has been employed in the past to make a passive standoff barrier to withstand the destructive force of an explosion, such as the detonation of a bomb. However, barriers made from concrete take time to construct and once constructed are permanent. Also, rigid concrete barriers do not absorb or dissipate shock pressure effectively. Instead, such barriers efficiently transmit the incident shock pressures through the barrier and apply pressure loading to the elements disposed on the other side of the barriers. As the result of the efficient transmission of the shock pressure pulse, rigid concrete barriers may spall and create harmful flying debris and/or may, in later time, crumble and create damaging falling debris. One method to absorb pressure pulses created by explosion has been to use water filled barriers. Blast dissipative structures using water-based technology are disclosed, for instance, in U.S. Pat. No. 4,836,079. As disclosed therein, bomb blast inhibitors can be inflated with air, placed around a bomb, and then filled with water, the water then acting to suppress or otherwise mitigate against the effects of any ensuing explosion. However, use of liquids having a relatively low viscosity (e.g., water) generally, if permitted, will flow to the regions of lowest potential energies as directed by gravity. Consequently, the use of such liquids requires that the liquid be contained in a desired initial configuration and limits the configuration and application of structures utilizing such a liquid. Moreover, the barrier needs to be erected where there is an adequate water supply. The barriers are often bulky which can pose transportation problems and add to the cost of using them and render them undesirable for utilization by a vehicle or by personnel.

Other attempts to provide blast dissipative structures are described in U.S. Pat. Nos. 7,575,797 and 6,200,664. 7,575,797 describes a blast reducing structure including a plurality of webs forming discrete funnel-shaped container elements containing volumes of liquid or deformable materials, such as liquids or materials. The liquid or deformable materials in the discrete container elements are constrained initially by a grommet, plug, or other sealing member and flow upon rupture from impact pressures. Alternate container elements formed by the webs are air-filled so as to accept the expelled liquid from adjacent container elements. The liquids or deformable materials flow through apertures formed in each of the plurality of webs to absorb impact energy.

U.S. Pat. No. 6,200,664 describes a structure for containing an explosion including a plurality of truncated polyhedral container elements secured to and projecting from a base sheet. Each polyhedral element is filled with a liquid, such as water, and is constructed to collapse in the event of an explosion. An opening in each of the polyhedral container elements is sealed by a burst disk or a removable seal that opens in the event of an explosion. The opening is sized to effect a misting action of the liquid therein when it is ejected from the openings by the collapse of the polyhedral container elements caused by the explosion. The liquid mist serves to absorb and dissipate the heat and energy of the explosion.

As mentioned above, each of the devices described in U.S. Pat. Nos. 7,575,797 and 6,200,664, utilize single rows of discrete container elements having a flowable liquid or deformable material disposed therein. Such elements require the use of a sealing member, such as a plug to contain the liquid or deformable material within the element prior to impact. Furthermore, the single rows of sealed, discrete container elements only expel the liquid or deformable material into an adjacent volume or element. During an impact, such configurations will only release the liquid or deformable materials from the container elements that were directly contacted by the impact of the force with sufficient magnitude. The liquid or deformable materials could also be released accidentally by evaporation and expansion of the liquid and gas.

BRIEF SUMMARY

In accordance with some embodiments of the present invention, a dissipative structure includes at least one panel configured to receive a force and a cell structure disposed adjacent to the at least one panel having a plurality of interconnected cells. Each interconnected cell of the plurality of interconnected cells includes a plurality of apertures formed therein. At least one hydrogel is disposed within at least one interconnected cell of the plurality of interconnected cells proximate to the at least one panel.

In additional embodiments, the present invention includes a dissipative structure, comprising at least one panel and a cell structure disposed adjacent the at least one panel. The cell structure comprising a plurality of interconnected cells may be formed by a plurality of wall elements. Each wall element of the plurality of wall elements may include a mesh formed by a plurality of overlapping fibers having a plurality of apertures formed therebetween. The plurality of apertures may form a plurality of passageways between the plurality of interconnected cells. The dissipative structure may also include a deformable material disposed within at least one interconnected cell of the plurality of interconnected cells proximate to the at least one panel.

In yet additional embodiments, the present invention includes a method of dissipating a force including disposing at least one hydrogel in at least one interconnected cell of a plurality of interconnected cells formed by a plurality of walls of a cell structure proximate to at least one panel, applying a force to the at least one panel, and forcing at least a portion of the at least one hydrogel through a plurality of apertures formed in the plurality of walls of the cell structure.

BRIEF DESCRIPTION OF THE SEVERAL VIEWS OF THE DRAWINGS

While the specification concludes with claims particularly pointing out and distinctly claiming that regarded as embodiments of the present invention, the advantages of embodiments of the invention may be more readily ascertained from the following description of embodiments of the invention when read in conjunction with the accompanying drawings in which:

DETAILED DESCRIPTION

The illustrations presented herein are not meant to be actual views of any particular material, apparatus, system, or method, but are merely idealized representations which are employed to describe embodiments of the present invention. Additionally, elements common between figures may retain the same numerical designation for convenience and clarity.

Figure 1:
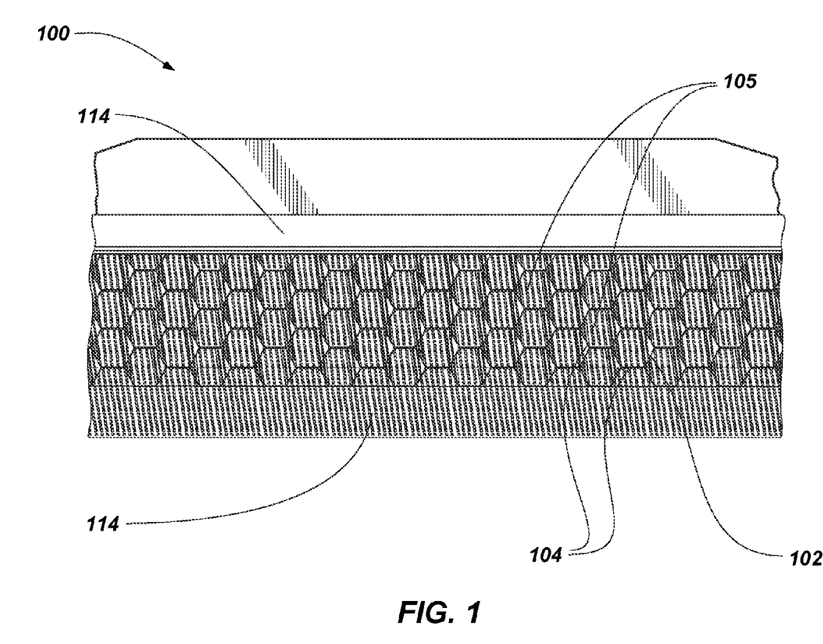
FIG. 1 is a perspective view of an embodiment of a dissipative structure of the present invention.

FIG. 1 illustrates a perspective view of an embodiment of a dissipative structure 100. Referring to FIG. 1, the dissipative structure 100 may include a cell structure 102. The cell structure 102 may include a plurality of interconnected cells 104 disposed between one or more outer layers. The interconnected cells 104 may include apertures 105 extending between the interconnected cells 104. Each interconnected cell 104 may be interconnected to at least one additional cell of interconnected cells 104 through one or more apertures 105. For example, as described in detail below, one cell of the interconnected cells 104 may be connected to each adjacent cell through passageways formed by the apertures 105.

Figure 2:
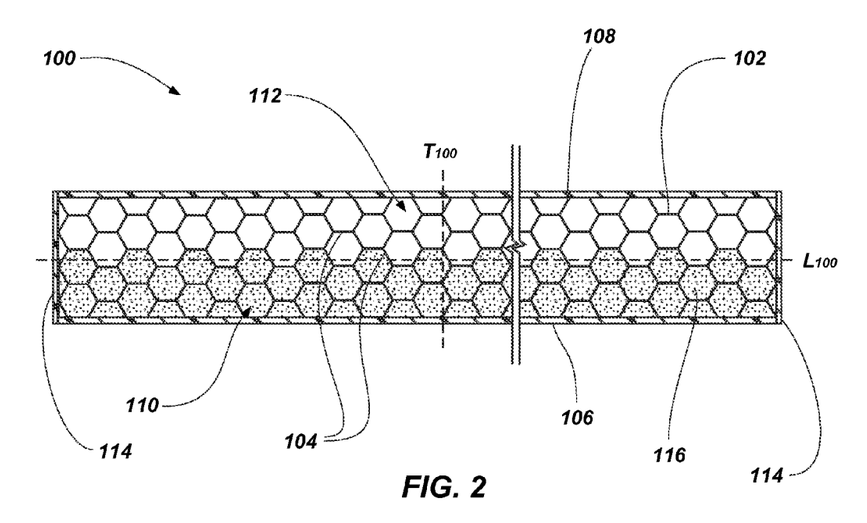
FIG. 2 is a side view of the dissipative structure shown in FIG. 1 having a deformable material disposed therein.

FIG. 2 illustrates a side view of the dissipative structure 100. Referring to FIG. 2, the dissipative structure 100 may include an outer layer such as, for example, a panel disposed on a side of the dissipative structure 100. For example, the interconnected cells 104 of the cell structure 102 may be disposed between a proximal panel 106 and a distal panel 108. As used herein, the terms "distal" and "proximal" are relative terms used to describe portions of a dissipative structure or component thereof with reference to an exterior surface of the dissipative structure that is configured to receive a force (e.g., a force from an explosion, projectile, collision, etc.). A "distal" portion of a dissipative structure or component thereof is the portion relatively more distant from the surface configured to receive a force. A "proximal" portion of dissipative structure or component thereof is the portion in closer relative proximity to the surface configured to receive a force. The proximal panel 106 and the distal panel 108 may be formed from any suitable material to provide an outer layer of the cell structure 102 that may receive a force to be dissipated by the dissipative structure 100. For example, the panels 106, 108 may comprise a polymer, a fabric, a composite, a foam, a ceramic, a metal, a metal alloy, wood, thin film (e.g., the side of a vehicle), etc. In some embodiments, the panels 106, 108 may be formed from a material providing additional protection to the items of value situated behind distal panel 108 (e.g., a high-strength material, such as a composite, high-strength metal or metal alloy or a ceramic, that provides additional protection from a projectile, shrapnel, debris from an explosion, etc.).

The proximal panel 106 may form an outer portion of the dissipative structure 100 proximate to a proximal portion 110 of the cell structure 102 and the distal panel 108 may form an outer portion of the dissipative structure 100 proximate to a distal portion 112 of the cell structure 102. The dissipative structure 100 may also include outer portions 114 disposed around the periphery of the dissipative structure 100. The outer portions 114 may be formed from a material such as, for example, an impermeable (e.g., impermeable to a fluid) fabric, composite, polymer, etc. In some embodiments, the outer portions 114 may substantially enclose the cell structure 102 at the sides of the cell structure 102 not covered by the panels 106, 108. For example, the dissipative structure 100 may be substantially rectangular in shape and may have a transverse axis $T_{100}$ and a longitudinal axis $L_{100}$. The panels 106, 108 may cover the cell structure 102 on two sides of the cell structure 102 extending parallel to the longitudinal axis $L_{100}$ (i.e., along opposing faces of the cell structure 102). The outer portions 114 may cover the cell structure 102 on the remaining four sides of the cell structure 102 extending parallel to the transverse axis $T_{100}$. In some embodiments, the panels 106, 108, and the outer portions 114 may be formed from a permeable material (e.g., a fabric, composite, etc.) enabling a deformable material to pass therethrough. In some embodiments, the outer portions 114 may be formed from a material enabling the cell structure 102 to translate (e.g., compress) in response to a force applied thereto. For example as shown in FIG. 1, the outer portions 114 may comprise a flexible material such as a flexible fabric material (e.g., a fiberglass mesh). In other embodiments, the outer portions 114 may comprise substantially rigid material (e.g., a composite, a metal, a metal alloy, a ceramic, a foam, etc.) and may be positioned external to the panels 106, 108 (i.e., at or beyond the periphery of the panels 106, 108) to enable the panels 106, 108 to translate within the outer portions 114.

Referring still to FIG. 2, the cell structure 102 may include a plurality of rows of interconnected cells 104 extending between the proximal panel 106 and the distal panel 108. For example, two or more interconnected cells 104 may extend between the proximal panel 106 and the distal panel 108 in a direction along the transverse axis $T_{100}$ of the dissipative structure 100. In some embodiments, the rows of interconnected cells 104 may be offset from one another. For example, each interconnected cell 104 may be offset from each adjacent interconnected cell 104 along the longitudinal axis $L_{100}$ of the dissipative structure 100.

A deformable material such as, for example, hydrogel 116 may be disposed within one or more of the interconnected cells 104 of the cell structure 102. For example, the hydrogel 116 may be disposed within the cell structure 102 in the proximal portion 110 of the cell structure 102 proximate the proximal panel 106. In some embodiments, the hydrogel 116 may be disposed within the interconnected cells 104 located in the proximal portion 110 of the cell structure 102 while the interconnected cells 104 located in the distal portion 112 of the cell structure 102 are substantially free of hydrogel 116. For example, the interconnected cells 104 located in the distal portion 112 of the cell structure 102 may be substantially empty (i.e., containing only atmosphere (e.g., air)). In other embodiments, the interconnected cells 104 located in the distal portion 112 of the cell structure 102 may contain a vacuum or may be filled with a gas. In some embodiments, the hydrogel 116 may substantially fill each of the interconnected cells 102 located proximate to the proximal panel 106.

The hydrogel 116 contained within the interconnected cells 104 may include an absorbent polymer having a fluid (e.g., water ($H_2O$)) absorbed therein. For example, the hydrogel 116 may be formed from a cross-linked sodium polyacrylate polymer. In some embodiments, the hydrogel 116 may include a "finer" absorbent polymer comprising a polymer powder having an average particle size of less than 1000 microns (preferably, 150 microns or less), Such finer polymer particles may enable the hydrogel 116 to absorb relatively more liquid than a relatively coarser polymer powder having an average particle size of greater than 1000 microns. The viscosity (or the resistance to flow under force) of the hydrogel 116 is a function of the amount of liquid absorbed per unit mass of hydrogel powder.

It is noted that, as described herein, the displacement or movement of a deformable material through a cell structure of a dissipative structure may include displacement or movement of the deformable material or portions thereof. For example, displacement or movement of a hydrogel through a cell structure may include displacement of the hydrogel itself (i.e., a polymer having a fluid absorbed therein), displacement of the fluid contained in the hydrogel that is separated from the hydrogel (e.g., absorbed water may be released from the hydrogel under pressure) or combinations thereof.

Figure 3:
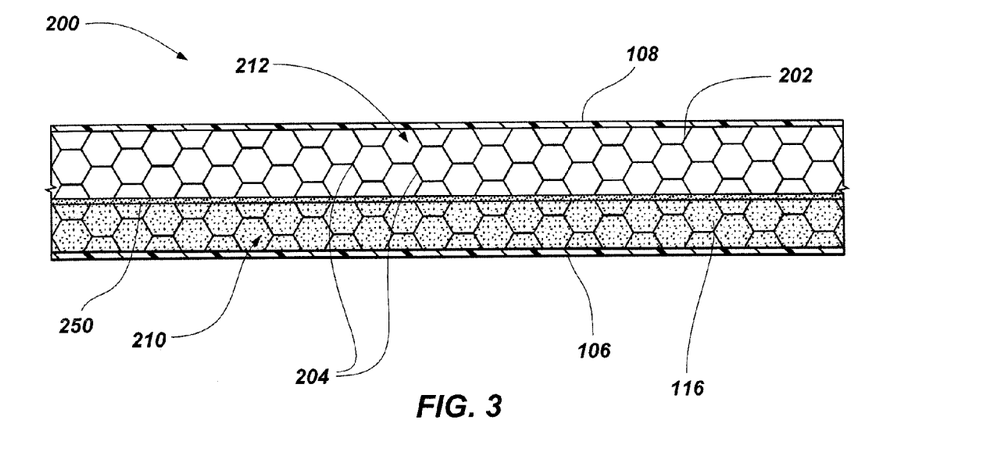
FIG. 3 is a side view of a dissipative structure having a deformable material and a divider disposed therein in accordance with another embodiment of the present invention.

FIG. 3 illustrates a side view of a dissipative structure 200 having a deformable material and a divider disposed therein in accordance with another embodiment of the present invention. As shown in FIG. 3, the dissipative structure 200 may be similar to the dissipative structure 100 shown and described with reference to FIGS. 1 and 2. The dissipative structure 200 may include a cell structure 202 having interconnected cells 204 disposed between a proximal panel 106 and a distal panel 108. The dissipative structure 200 may include a divider (e.g., a permeable divider 250) disposed between a proximal portion 210 of the cell structure 202 and a distal portion 212 of the cell structure 202. A hydrogel 116 may be disposed within the cell structure 204 in the proximal portion 210 of the cell structure 202 in a location proximate to the proximal panel 106. For example, the hydrogel 116 may be disposed within the cell structure 202 to substantially extend from the proximal panel 106 to the permeable divider 250. The permeable divider 250 may partially retain the hydrogel 116 in the proximal portion 210 of the cell structure 202 prior to the dissipative structure 200 receiving a force to be dissipated.

The permeable divider 250 may be formed from any suitable material that enables a deformable material (e.g., hydrogel 116, a fluid stored in the hydrogel 116, or a combination thereof) to pass therethrough. For example, the permeable divider 250 may be formed from a woven fabric that is otherwise generally impermeable but has apertures formed therein, or by a composite. In some embodiments, the permeable divider 250 may be formed from a fiberglass mesh similar to the fiberglass mesh 130 (described below with reference to FIG. 6) having apertures 105 formed between overlapping fiberglass fibers. Such a material may enable a portion of the hydrogel 116 to pass through the permeable divider 250 when a selected amount of force is applied to the dissipative structure 200. The permeable divider 250 may act to constrict the flow of the hydrogel 116 in a direction of flow extending from the proximal portion 210 of the cell structure 202 to the distal portion 212 of the cell structure 202. For example, an applied force of a selected magnitude may be required to displace portions of the hydrogel 116 through the apertures 105 (FIG. 1) of the cell structure 202. The permeable divider 250 may act to stiffen the dissipative structure 200 by requiring additional force (i.e., force in addition to the force required to displace portions of the hydrogel 116 through the apertures 105) to displace portions of the hydrogel 116 traveling from the proximal portion 210 of the cell structure 202 to the distal portion 212 of the cell structure 202 through the permeable divider 250.

Figure 4:
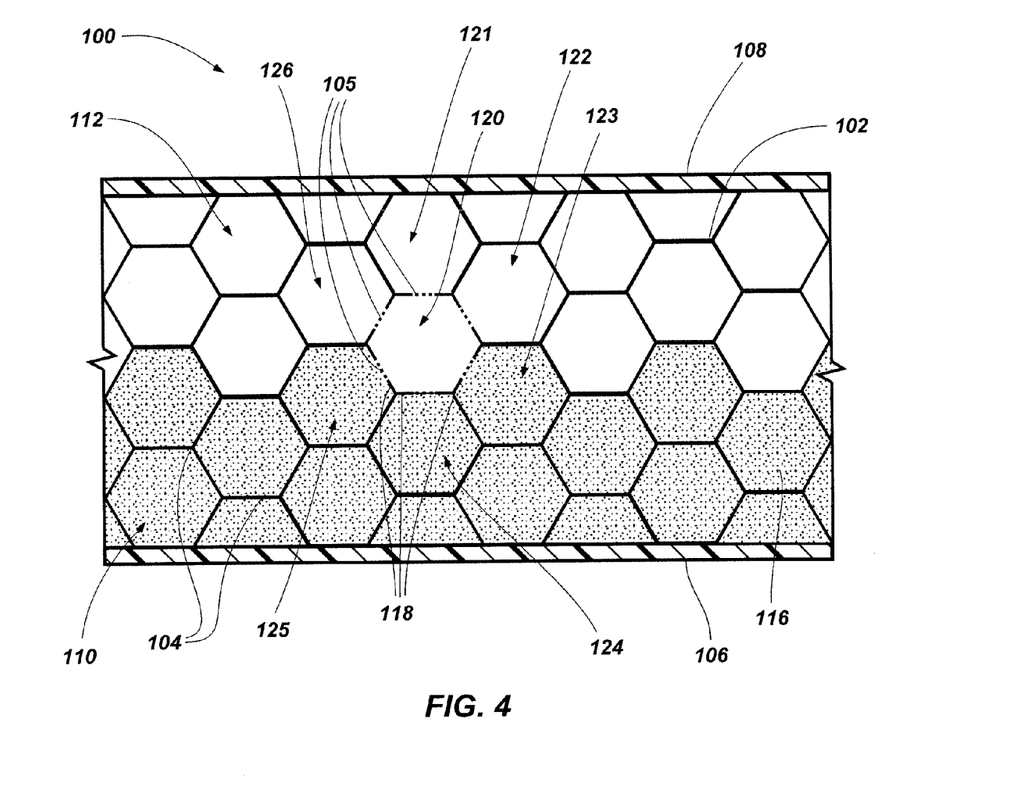
FIG. 4 is an enlarged cross-sectional view of a portion of the dissipative structure shown in FIG. 2.

FIG. 4 illustrates an enlarged cross-sectional view of a portion of the dissipative structure 100. As shown in FIG. 4, the hydrogel 116 may be disposed in a plurality of interconnected cells 104 in the proximal portion 110 of the cell structure 102. The interconnected cells 104 may include apertures 105 formed in walls 118 of the interconnected cells 104. For example, one interconnected cell 120 may include an aperture 105 forming a passageway to an interconnected cell 124 adjacent to the interconnected cell 120 in a transverse direction (e.g., in a direction along the transverse axis $T_{100}$ (FIG. 2)) and another aperture 105 forming a passageway to another interconnected cell 123 adjacent to the interconnected cell 120 in a longitudinal direction (e.g., in a direction along the longitudinal axis $L_{100}$ (FIG. 2)). In some embodiments, the walls 118 of the interconnected cells 104 may include a plurality of apertures 105 formed in each wall 118 (e.g., multiple rows of apertures 105 formed in each wall 118 as shown in FIG. 1). Referring still to FIG. 4, the interconnected cells 104 may include six walls 118 forming a substantially hexagonal shape. Each of the six walls 118 may include one or more apertures 105 formed therein to interconnect one interconnected cell 120 of the interconnected cells 104 with each adjacent interconnected cell 121, 122, 123, 124, 125, 126. Such a configuration may enable portions of the hydrogel 116 disposed in one interconnected cell 120 to be displaced into the other interconnected cells 121, 122, 123, 124, 125, 126 adjacent to the interconnected cell 120. In a similar manner, hydrogel 116 disposed in each interconnected cell 121, 122, 123, 124, 125, 126 adjacent to the interconnected cell 120 may be displaced into the interconnected cell 120. It is noted that while the interconnected cells 104 of the cell structure 102 are illustrated and described herein as being substantially hexagonal in shape, the interconnected cells of the cell structure may be formed in any suitable geometric shape such as, for example, circular, elliptical, triangular, quadrilateral (e.g., square, rectangle, etc.), pentagonal, heptagonal, octagonal, nonagonal, decagonal, dodecagonal, otherwise polygonal, or combinations thereof.

Figure 5:
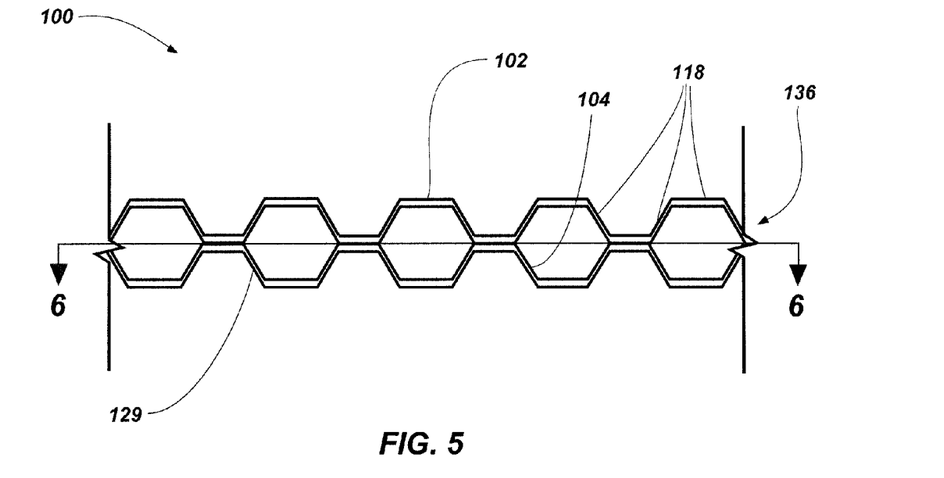
FIG. 5 is an enlarged side view of a portion of a cell structure of a dissipative structure in accordance with an embodiment of the present invention.

As shown in FIG. 5, in some embodiments, the cell structure 102 of the dissipative structure 100 may be formed by a material (e.g., a sheet of material) used to produce wall elements 128, 129 forming one or more walls 118 of the interconnected cells 104. For example, the wall elements 128, 129 may be formed from preformed sheets of fabric that are fashioned to exhibit the shape of the interconnected cells 104 of the cell structure 102 or portions thereof. In some embodiments, the wall elements 128, 129 may be formed from a fiberglass mesh 130 (FIG. 6) having an epoxy applied thereto to stiffen the fiberglass mesh 130 in order to form the interconnected cells 104 of the cell structure 102 or portions of the interconnected cells 104. For example, a first wall element 128 may be produced to form a first portion of a row 136 of interconnected cells 104. Similarly, a second wall element 129 may be produced to form a second portion of the row 136 of interconnected cells 104. In some embodiments, the wall elements 128, 129 may be bonded together to form a portion of the cell structure 102. As also shown in FIG. 5, in some embodiments, the wall elements 128, 129 may be produced to form more than one row 136 of interconnected cells 104. For example, the wall elements 128, 129 may form a portion of one row 136 of interconnected cells and a portion of one or more additional rows of interconnected cells 104.

Figure 6:
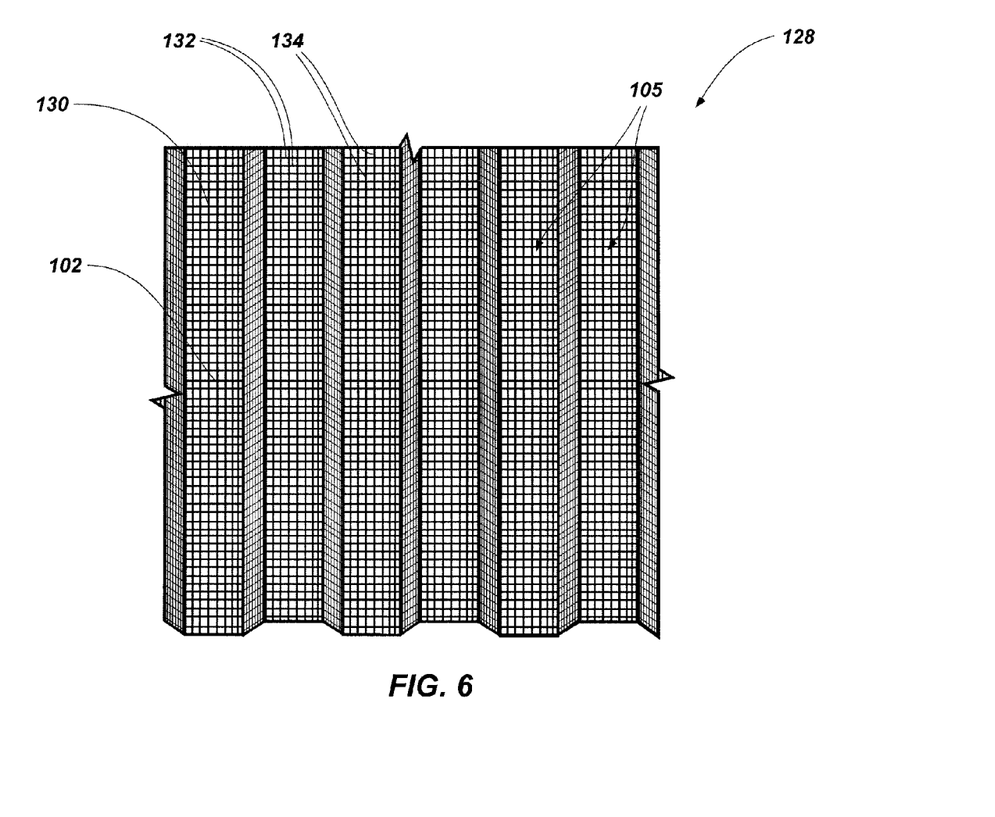
FIG. 6 is cross-sectional view of a portion of the cell structure shown in FIG. 5 as indicated by section line 6-6 in FIG. 5.

FIG. 6 illustrates a cross-sectional view of a wall element 128 of the cell structure 102 as indicated by section line 6-6 in FIG. 5. As shown in FIG. 6, the wall element 128 may be formed from a permeable material such as, for example, a fiberglass mesh 130. The fiberglass mesh 130 may be formed from overlapping longitudinal fibers 132 and transverse fibers 134. In some embodiments, the fiberglass mesh 130 may be formed from other fiber configurations and orientations (e.g., interwoven fibers, fibers oriented at oblique angles with respect to one another, etc.). The overlapping longitudinal fibers 132 and transverse fibers 134 may be orientated to form apertures 105 in the fiberglass mesh 130. As discussed above with reference to FIG. 4, such apertures 105 may form passageways between interconnected cells 104 of the cell structure 102 enabling a deformable material (e.g., hydrogel 116 (FIG. 4)) to pass therethrough. It is noted that while the embodiment of FIG. 6 illustrates the wall element 128 being formed from a fiberglass mesh 130; the wall element 128 may be formed from any suitable material (other fiber meshes including synthetic or natural fibers, for example).

Figure 7:
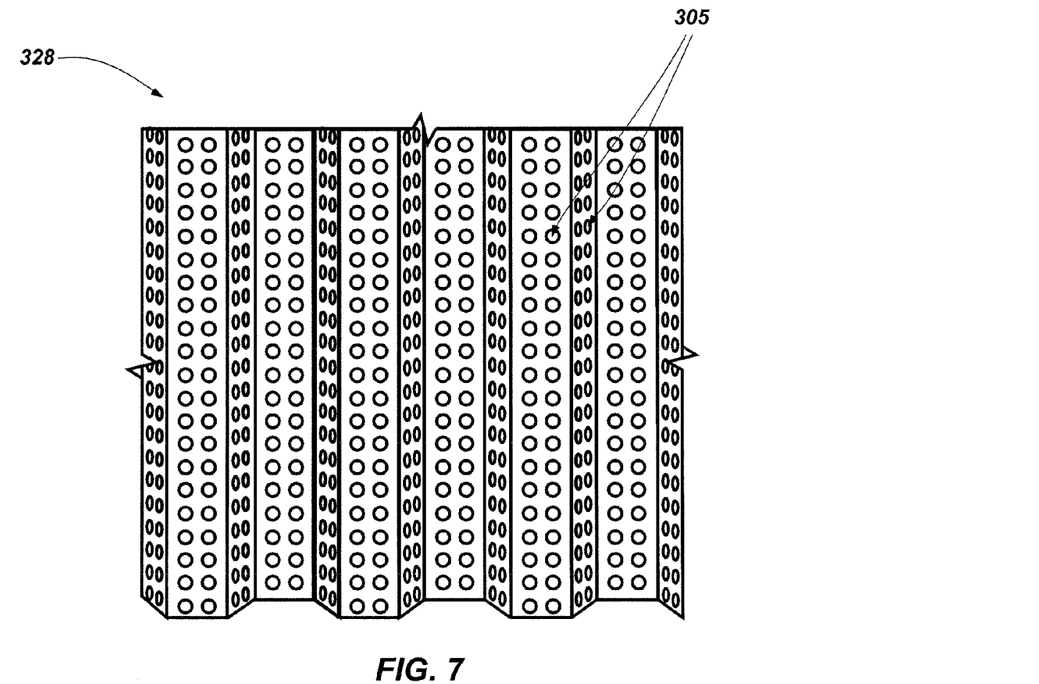
FIG. 7 is a cross-sectional view of a portion of a cell structure of a dissipative structure in accordance with yet another embodiment of the present invention.

FIG. 7 illustrates another embodiment of a wall element 328 of a cell structure of a dissipative structure (e.g., cell structure 102 of dissipative structure 100 (FIG. 1)). As shown in FIG. 7, the wall element 328 may be formed from a sheet of material having a plurality of apertures 305 formed therein. For example, in contrast to the embodiments shown and described with reference to FIG. 6, the wall element 328 may be formed from a substantially impermeable material (e.g., a substantially impermeable composite material, a polymer, a metal, a metal alloy, etc.) having apertures 305 machined or otherwise formed therein.

Figure 8:
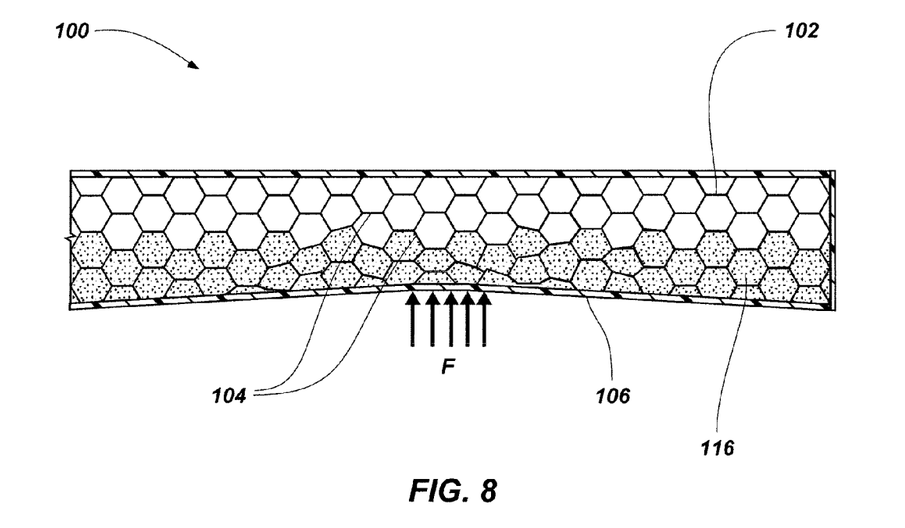
FIG. 8 is a side view of the dissipative structure shown in FIG. 2 having a force applied to the dissipative structure.

Referring now to FIG. 8, in operation, a force F (e.g., pressure (force per unit area)) may be applied to the dissipative structure 100 (e.g., at the proximal panel 106). Such a force or pressure may be the result of, for example, a shockwave from an explosive blast, a force from a projectile, a force from a collision, etc. As shown in FIG. 8, the proximal panel 106 and the interconnected cells 104 proximate to the applied force F may deform in response to the force F. For example, the proximal panel 106 may bend inwardly toward the cell structure 102 and a portion of the cell structure 102 may be compressed. The force F applied to the dissipative structure 100, the deformation of the proximal panel 106, and the compression of the cell structure 102 may cause portions of the hydrogel 116 within the interconnected cells 104 to move through the interconnected cells 104. The force F from the impact of a shockwave or projectile may apply a pressure to the hydrogel 116 in the interconnected cells 104. For example, compression of the cell structure 102 due to deformation of the proximal panel 106 will pressurize the contents (i.e., the hydrogel 116) of the interconnected cells 104 located proximate to the proximal panel 106 by reducing the volume in the interconnected cells 104. Under the force F, portions of the hydrogel 116 will tend to move to relatively lower pressure areas of the cell structure 102 (e.g., the interconnected cells 104 without hydrogel 116 disposed therein). The movement of the portions of the hydrogel 116 from a relatively high pressure area (e.g., a cell filled with hydrogel 116 being acted upon by the force F) to a relatively lower pressure area (e.g., an empty or partially empty interconnected cell 104) through restricted openings (e.g., the apertures 105 (FIG. 4)) will act to dissipate the force F applied to the dissipative structure 100. In some embodiments, in response to the applied force F, the fluid (e.g., water) contained in the hydrogel 116 may be released from the hydrogel 116 and may be displaced through the apertures 105 (FIG. 4). In some embodiments, both the fluid released from the hydrogel 116 and a portion of the remaining hydrogel 116 may be forced through the apertures 105 (FIG. 4). In addition to the displacement of portions of the hydrogel 116 through the cell structure 102, the deformation of the proximal panel 106 and cell structure 102 may also act to dissipate the force F.

The hydrogel 116 within the interconnected cells 104 may be displaced in any direction with respect to the force F. For example, as shown in FIG. 4, the apertures 105 formed on each wall 118 of the interconnected cells 104 enable the hydrogel 116 to travel through each wall 118 of the interconnected cells 104 (e.g., along the transverse axis $T_{100}$ and the longitudinal axis $L_{100}$ of the dissipative structure 100 and at multiple angles therebetween). The cell structure 102 is compressible (i.e., collapsible) under the force F which enables the interconnected cells 104 of the cell structure 102 to compress and drive fluid flow of the hydrogel 116. The apertures 105 formed in the walls 118 of the interconnected cells 104 may be sized to enable flow of fluid, but small enough to prevent flow of hydrogel 116 in an initial state (e.g., prior to the application of a force F to the dissipative structure 100).

Figure 9:
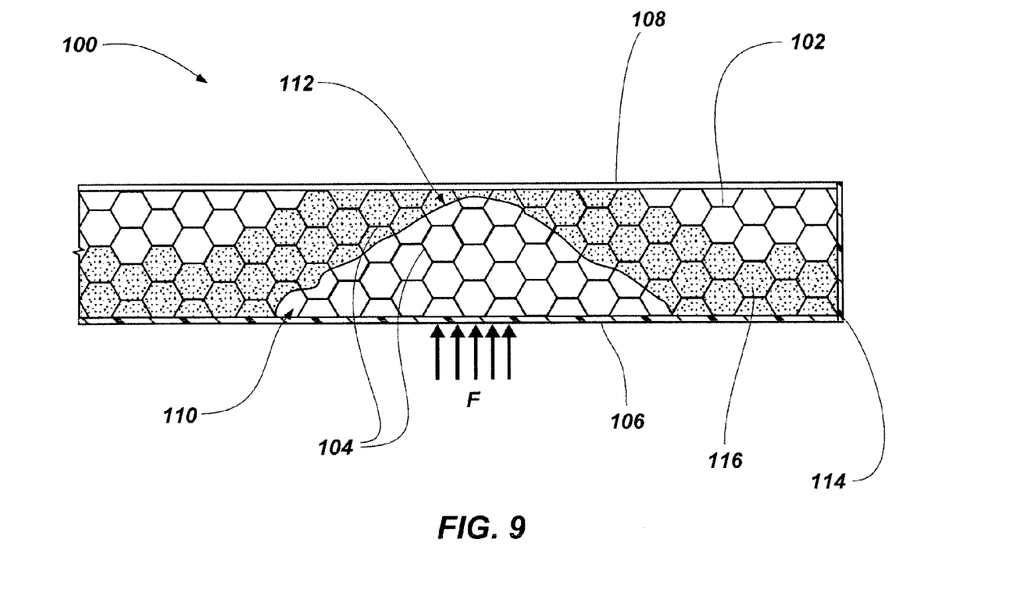
FIGS. 9 and 10 are side views of the dissipative structure shown in FIG. 8 after a force is applied to the dissipative structure.
Figure 10:
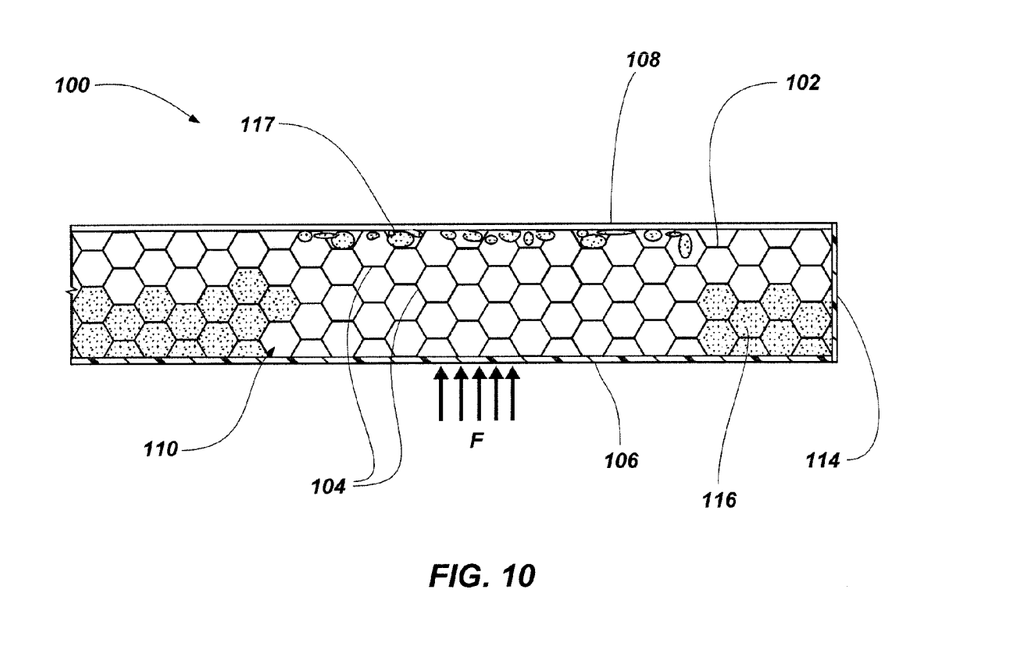

FIGS. 9 and 10 are side views of the dissipative structure 100 after the force F is applied to the dissipative structure 100. As shown in FIG. 9, the force F applied to the dissipative structure 100 may act to displace portions of the hydrogel 116 disposed in the interconnected cells 104 proximate to the applied force F from the proximal portion 110 of the cell structure 102 toward the distal portion 112 of the cell structure 102 through the apertures 105 (FIG. 4). It is again noted that FIG. 9 is an idealized representation of the dissipative structure 100. As understood by those with skill in the art, the configuration of the hydrogel 116, after the hydrogel 116 has been displaced through the cell structure 102 to dissipate the force F, may vary substantially from the configuration shown in FIG. 9. For example, as shown in FIG. 10, the hydrogel 116 may be displaced in a manner as to leave only remnants of the hydrogel 117 in the cell structure 102. As discussed above, in some embodiments, the panels 106, 108, and the outer portions 114 may also be formed from a permeable material (or portions of the cell structure may be open at an exterior portion of the dissipative structure) to enable portions of the hydrogel 116 to be displaced from the cell structure 102.

In some embodiments, the apertures may be designed to optimally balance hydrogel retention and permeability. For example, flow through relatively small apertures (e.g., small enough to retain hydrogel but still enable the passage of a fluid) dissipates more energy than does flow through a larger aperture (per unit area).

Referring back to FIGS. 1 and 4, as described above, displacement of the hydrogel 116 through the cell structure 102 of the dissipative structure 100 may reduce the magnitude of the transmitted force F and elongate the duration over which the force F is applied. The deformation of the proximal panel 106 and cell structure 102 may also act to dissipate the force F. The force F may be dissipated by the dissipative structure 100 by the restricted hydraulic flow of the hydrogel 116 that occurs within the cell structure 102 (e.g., the energy losses that result from portions of the hydrogel 116 being forced through the apertures 105 of the interconnected cells 104). Such a configuration may provide a smaller force applied over a longer time span instead of a large force imparted quickly. The dissipative structure 100 may provide an impulse (the time integral of force) due to an applied force having a magnitude relatively lower than a magnitude of an impulse due to the same applied force acting on a system without a dissipative structure 100.

In some embodiments, a dissipative structure may reduce a force applied to the dissipative structure by approximately 30% to 60% in magnitude and may reduce the impulse caused by the force by approximately 60% to 95%. For example, a single panel formed from polyethylene having a thickness of 0.25 inch (6.35 millimeters) was subjected to a force on a proximal side thereof having a peak magnitude of approximately 600 lbs (2.67 kN) and a positive phase duration of approximately two (2) milliseconds. The single panel exhibited a substantially similar peak load of approximately 600 lbs (2.67 kN) at a load sensor position on the distal side of the panel and a peak impulse of approximately 1.25 lb● second (5.56 N● second). A dissipative structure having a cell structure with hydrogel disposed between two panels (e.g., a proximal panel and distal panel) formed from polyethylene having a thickness of 0.25 inch (6.35 millimeters) was concurrently subjected to the same force as the single panel at the proximal panel of the dissipative structure. A load sensor at the distal panel of the dissipative structure exhibited a peak magnitude of approximately 360 lbs (1.60 kN) and a peak impulse of approximately 0.125 lb● second (0.556 N● second). As a result, the dissipative structure having a cell structure with hydrogel disposed therein exhibited a 55% reduction in peak force and a 90% reduction in peak impulse at the distal panel of the dissipative structure.

In order to dissipate a desired amount of force, the dissipative structure 100 may be designed in order to exhibit a desired amount of stiffness. For example, a dissipative structure having a cell structure including relatively more interconnected cells therein may exhibit a stiffness greater than a dissipative structure having less interconnected cells. Similarly, a dissipative structure having a cell structure including relatively smaller interconnected cells therein may exhibit a stiffness greater than a dissipative structure having relatively larger interconnected cells. Further, a dissipative structure having a cell structure including relatively smaller apertures formed therein or a relatively fewer number of apertures may exhibit a stiffness greater than a dissipative structure having relatively larger apertures or a relatively greater number of apertures. In some embodiments, the amount of deformable material may also enable a dissipative structure to exhibit a selected amount of stiffness. For example, a dissipative structure having a cell structure including a greater amount of deformable material disposed therein may exhibit a stiffness greater than a dissipative structure having relatively lesser amount of deformable material disposed therein. In some embodiments, the dissipative structure may include other elements to increase the stiffness of the dissipative structure. For example, as discussed above with reference to FIG. 3, the permeable divider 250 of dissipative structure 200 may further constrict flow of portions of the hydrogel 116 from passing from the proximal portion 210 of the cell structure 202 to the distal portion 212 of the cell structure 202. In other embodiments, portions of a cell structure may provide a varying stiffness. For example, a cell structure may include a proximal portion exhibiting relatively less stiffness as compared to a distal portion. Such variations in stiffness in the cell structure may be accomplished by combinations of the above-described examples. Differing orientations of portions of the cell structure may also be implemented. For example, a cell structure may include a proximal portion that is aligned as shown in FIG. 2, and exhibits relatively less stiffness as compared to a distal portion that is aligned in a transverse manner to the interconnected cells shown in FIG. 2 (e.g., the longitudinal axes of the interconnected cells may be allied to extend parallel to the transverse axis $T_{100}$)

In view of the above, embodiments of the present invention may be particularly useful in providing a dissipative structure that reduces the transmitted force magnitude and elongates the duration over which the force is applied. Such a dissipative structure may provide a smaller load applied over a longer time span instead of a large load imparted quickly (i.e., a dissipative structure may act to reduce the magnitude of an impulse of an applied force). Additionally, it may provide a smaller total impulse. The dissipative structure may reduce the peak loads and impulse caused by a force applied to the dissipative structure, thus protecting a selected target (e.g., a structure, building, vehicle, personnel, etc.) from lethal and damaging pressures and forces. The dissipative structure may be applied to protect high-value items or areas that are susceptible to large blast impulses. The dissipative structure may be formed from relatively lightweight materials (e.g., composites, polymers, etc.) and may be applied in any size, shape, or orientation to form, for example, personnel vests, enclosed blast chambers, vehicle walls, building walls, etc.

Use of a dissipative structure including a deformable material such as a hydrogel may provide a long shelf-life as hydrogel sealed within the dissipative structure may retain the fluid therein. For example, a hydrogel such as, for example, sodium polyacrylate may absorb approximately fifty times its weight in fluid, may hold the fluid for years, and may be dried and re-wetted at a later time. Further, as the hydrogel may be formed to not be flowable without a force applied thereto, the hydrogel may be maintained in its initial position in the cell structure of the dissipative structure while being positioned in any desired orientation with respect to gravity. That is, unlike a structure utilizing a fluid such as water that will freely move under the influence of gravity, the hydrogel disposed in the dissipative structure retains a substantial amount of fluid within the hydrogel in an initial position irrespective to gravitational forces. The hydrogel and fluid contained therein may then be released upon application of a force to the dissipative structure. Additionally, unlike a structure utilizing a fluid that requires that the fluid be sealed to retain it in an initial position, the hydrogel-filled interconnected cells of the dissipative structure may be activated by applied pressures at any loading (or strain) rate and do not need to be sealed in an initial position. Furthermore, the interconnected cells of the dissipative structure may enable the entire dissipative structure or portions proximate to and surrounding an impact of an applied force to react to an applied force, rather than only enabling discrete container elements directly contacted by an applied force to react.

While the present invention may be susceptible to various modifications and alternative forms, specific embodiments have been shown by way of example in the drawings and have been described in detail herein; however, it should be understood that the invention is not intended to be limited to the particular forms disclosed. Rather, the invention includes all modifications, equivalents, legal equivalents, and alternatives falling within the scope of the invention as defined by the following appended claims.

What is claimed is:

1. A dissipative structure, comprising:
   at least one panel configured to receive a force;
   a cell structure disposed adjacent to the at least one panel, the cell structure comprising a plurality of interconnected cells, each of the plurality of interconnected cells being formed by a plurality of walls having a plurality of apertures formed therein, the plurality of apertures interconnecting the plurality of interconnected cells; and
   at least one hydrogel disposed within a first plurality of interconnected cells of the plurality of interconnected cells that is positioned proximate to the at least one panel, wherein a second plurality of interconnected cells of the plurality of interconnected cells positioned relatively farther away from the at least one panel than the first plurality of interconnected cells is substantially free of the at least one hydrogel, and wherein the apertures of each of the first plurality of interconnected cells are configured to at least partially transfer the at least one hydrogel disposed therein to the second plurality of interconnected cells in response to the force received by the at least one panel.

2. The dissipative structure of claim 1, wherein the at least one panel comprises a proximal panel and a distal panel, the cell structure disposed between the proximal panel and the distal panel.

3. The dissipative structure of claim 2, wherein at least three interconnected cells of the plurality of interconnected cells extend between the proximal panel and the distal panel along an axis transverse to a longitudinal axis of the dissipative structure.

4. The dissipative structure of claim 2, wherein each interconnected cell of the plurality of interconnected cells adjacent to the distal panel is substantially free of the at least one hydrogel.

5. The dissipative structure of claim 1, further comprising a membrane disposed and extending between the first plurality of interconnected cells and the second plurality of interconnected cells, the membrane comprising a material being at least partially permeable to a portion of the at least one hydrogel.

6. The dissipative structure of claim 1, wherein the cell structure comprises a plurality of overlapping fibers forming the plurality of interconnected cells, the plurality of overlapping fibers forming a plurality of apertures therebetween, the plurality of apertures forming passageways between adjacent cells of the plurality of interconnected cells.

7. The dissipative structure of claim 1, wherein each interconnected cell of the plurality of interconnected cells comprises:
   a passageway to a first interconnected cell of the plurality of interconnected cells adjacent to the interconnected cell along a longitudinal axis of the dissipative structure; and
   another passageway to a second interconnected cell of the plurality of interconnected cells adjacent to the interconnected cell along a direction substantially transverse to the longitudinal axis of the dissipative structure.

8. The dissipative structure of claim 1, wherein each interconnected cell of the plurality of interconnected cells comprises six walls forming a substantially hexagonal shape and wherein each wall comprises at least one aperture formed therein.

9. A dissipative structure, comprising:
   a proximal panel configured to receive a force;
   a distal panel; and
   a cell structure disposed between the proximal panel and the distal panel, the cell structure comprising a plurality of interconnected cells formed by a plurality of wall elements, each wall element of the plurality of wall elements comprising a mesh formed by a plurality of overlapping fibers having a plurality of apertures formed therebetween, the plurality of apertures forming a plurality of passageways between the plurality of interconnected cells, wherein the plurality of interconnected cells comprises:
      a first plurality of interconnected cells having a deformable material disposed therein and positioned proximate the proximal panel; and
      a second plurality of interconnected cells being substantially free of the deformable material and positioned proximate the distal panel, wherein the plurality of passageways formed between the plurality of interconnected cells is configured to at least partially transfer the deformable material from the first plurality of interconnected cells to at least some of the second plurality of interconnected cells in a direction toward the distal panel in response to the force received by the proximal panel.

10. The dissipative structure of claim 9, wherein the cell structure comprises a fiberglass mesh comprising a plurality of overlapping fiberglass fibers and a resin.

11. The dissipative structure of claim 9, wherein the deformable material comprises a hydrogel comprising a polymer and a fluid absorbed in the polymer.

12. The dissipative structure of claim 9, wherein the cell structure comprises a plurality of rows of interconnected cells extending from a proximal side of the cell structure to a distal side of the cell structure.

13. The dissipative structure of claim 12, wherein each interconnected cell of the plurality of interconnected cells is offset from an adjacent interconnected cell of the plurality of interconnected cells along a longitudinal axis of the dissipative structure.

14. A method of dissipating a force, comprising:
   providing a dissipative structure, comprising:
      providing at least one panel configured to receive a force;
      providing a cell structure disposed adjacent to the at least one panel, the cell structure comprising a plurality of interconnected cells, each of the plurality of interconnected cells being formed by a plurality of walls having a plurality of apertures formed therein, the plurality of apertures interconnecting the plurality of interconnected cells; and
      providing at least one hydrogel disposed within, a first plurality of interconnected cells of the plurality of interconnected cells that is positioned proximate to the at least one panel, wherein a second plurality of interconnected cells of the plurality of interconnected cells positioned relatively farther away from the at least one panel than the first plurality of interconnected cells is substantially free of the at least one hydrogel, and wherein the apertures of each of the first plurality of interconnected cells are configured to at least partially transfer the at least one hydrogel disposed therein to the second plurality of interconnected cells in response to the force received by the at least one panel;

receiving a force with the at least one panel; and forcing at least a portion of the at least one hydrogel in a direction transverse to an interface between the at least one panel and the cell structure through the plurality of apertures formed in the plurality of walls of the cell structure.

15. The method of claim 14, wherein receiving a force to the at least one panel comprises deforming a portion of the at least one panel and a portion of the cell structure.

16. The method of claim 15, wherein receiving a force to the at least one panel further comprises compressing at least one interconnected cell of the plurality of interconnected cells of the cell structure.

17. The method of claim 14, wherein forcing at least a portion of the at least one hydrogel comprises forcing at least a portion of a liquid of the at least one hydrogel through the plurality of apertures formed in the plurality of walls of the cell structure and into at least another interconnected cell of the plurality of interconnected cells adjacent to the at least one interconnected cell of the plurality of interconnected cells.

18. The method of claim 14, wherein forcing at least a portion of the at least one hydrogel further comprises forcing at least a portion of a polymer of the at least one hydrogel through the plurality of apertures formed in the plurality of walls of the cell structure and into at least another interconnected cell of the plurality of interconnected cells adjacent to the at least one interconnected cell of the plurality of interconnected cells.

19. The method of claim 14, wherein forcing at least a portion of the at least one hydrogel comprises forcing the at least a portion of the at least one hydrogel into at least three adjacent interconnected cells of the plurality of interconnected cells.

20. The method of claim 14, wherein forcing at least a portion of the at least one hydrogel comprises forcing the at least a portion of the at least one hydrogel through a permeable membrane disposed within the cell structure.

* * * * *